United States Patent
Lee et al.

(10) Patent No.: US 10,021,162 B2
(45) Date of Patent: Jul. 10, 2018

(54) CLOUD STREAMING SERVICE SYSTEM, AND METHOD AND APPARATUS FOR PROVIDING CLOUD STREAMING SERVICE

(71) Applicant: SK TechX Co., Ltd., Seoul (KR)

(72) Inventors: Dong-Su Lee, Seongnam-si (KR); Dong-Gook Kim, Suwon-si (KR)

(73) Assignee: SK TechX Co., Ltd., Seoul (KR)

( * ) Notice: Subject to any disclaimer, the term of this patent is extended or adjusted under 35 U.S.C. 154(b) by 88 days.

(21) Appl. No.: 14/761,251

(22) PCT Filed: Nov. 21, 2014

(86) PCT No.: PCT/KR2014/011251
§ 371 (c)(1),
(2) Date: Jul. 15, 2015

(87) PCT Pub. No.: WO2015/119361
PCT Pub. Date: Aug. 13, 2015

(65) Prior Publication Data
US 2016/0197974 A1    Jul. 7, 2016

(30) Foreign Application Priority Data

Feb. 7, 2014    (KR) .......................... 10-2014-0013974
May 22, 2014    (KR) .......................... 10-2014-0061841

(51) Int. Cl.
*H04L 29/06*    (2006.01)
*G06F 3/14*    (2006.01)
(Continued)

(52) U.S. Cl.
CPC .......... *H04L 65/607* (2013.01); *G06F 3/1454* (2013.01); *H04L 67/10* (2013.01);
(Continued)

(58) Field of Classification Search
CPC ..... G06F 3/048; G06F 3/0481; H04L 65/601; H04L 65/607
(Continued)

(56) References Cited

U.S. PATENT DOCUMENTS 5,831,640 A * 11/1998 Wang .................. G06F 12/0875
345/419
7,430,723 B2 * 9/2008 Nolte .................... G06F 3/0481
715/764
(Continued)

FOREIGN PATENT DOCUMENTS

KR    1020000040087 A    7/2000
KR    1020120072904 A    7/2012

OTHER PUBLICATIONS

Meyn, Anselm Joseph. "Mobile Video Crawler: Implementing a video streaming Quality of Experience measurement system." (2014).*
(Continued)

*Primary Examiner* — Ranodhi Serrao
*Assistant Examiner* — James Fiorillo
(74) *Attorney, Agent, or Firm* — Hauptman Ham, LLP

(57) ABSTRACT

A cloud streaming service system and a method and apparatus for providing a cloud streaming service are disclosed. The cloud streaming server previously generates a section clip for a section having high resource usage, and performs a shortcut streaming procedure for sending the previously generated clip, rather than a normal streaming procedure, during the corresponding section, thereby efficiently utilizing the resources of a cloud streaming service system and thus increasing the maximum number of simultaneously executable applications.

5 Claims, 10 Drawing Sheets

(51) Int. Cl.
*H04N 21/24* (2011.01)
*H04N 21/845* (2011.01)
*H04L 29/08* (2006.01)

(52) U.S. Cl.
CPC ..... *H04N 21/2405* (2013.01); *H04N 21/8456* (2013.01); *G09G 2350/00* (2013.01); *G09G 2370/022* (2013.01)

(58) Field of Classification Search
USPC .......... 709/217, 219; 715/723, 764; 345/633
See application file for complete search history.

(56) References Cited

U.S. PATENT DOCUMENTS

| | | | | |
|---|---|---|---|---|
| 8,881,215 | B2* | 11/2014 | Perlman | A63F 13/12 725/114 |
| 9,037,683 | B1* | 5/2015 | Yoden | H04L 65/60 709/219 |
| 2007/0263983 | A1* | 11/2007 | Ando | H04N 5/76 386/248 |
| 2009/0003731 | A1* | 1/2009 | Nitta | G06F 3/1423 382/298 |
| 2009/0119737 | A1 | 5/2009 | Perlman et al. | |
| 2009/0213926 | A1* | 8/2009 | Shin | G06F 17/147 375/240.2 |
| 2010/0146139 | A1 | 6/2010 | Brockmann | |
| 2010/0284471 | A1* | 11/2010 | Tsai | H04N 19/70 375/240.24 |
| 2011/0088071 | A1* | 4/2011 | Yerli | H04N 21/2143 725/109 |
| 2011/0107220 | A1* | 5/2011 | Perlman | A63F 13/12 715/720 |
| 2011/0161493 | A1 | 6/2011 | Hamel et al. | |
| 2011/0167167 | A1 | 7/2011 | Prestenback et al. | |
| 2012/0184373 | A1 | 7/2012 | Kim et al. | |
| 2013/0054745 | A1* | 2/2013 | Ando | G11B 27/105 709/217 |
| 2013/0128060 | A1* | 5/2013 | Rhoads | G01C 21/20 348/207.1 |
| 2014/0019583 | A1* | 1/2014 | Sethuraman | H04L 65/601 709/217 |
| 2014/0033042 | A1* | 1/2014 | Khatib | G11B 27/034 715/723 |
| 2014/0095504 | A1* | 4/2014 | Soroushian | G06F 17/3002 707/737 |
| 2014/0307800 | A1* | 10/2014 | Sole Rojals | H04N 19/176 375/240.18 |
| 2014/0325450 | A1* | 10/2014 | Jang | H04M 1/72519 715/838 |
| 2014/0362248 | A1* | 12/2014 | Ishida | H04N 5/23293 348/222.1 |
| 2015/0029218 | A1* | 1/2015 | Williams | G06T 19/006 345/633 |
| 2015/0100901 | A1* | 4/2015 | Yamanaka | G06F 3/0481 715/761 |
| 2015/0163345 | A1* | 6/2015 | Cornaby | G06F 3/04847 345/633 |
| 2015/0215177 | A1* | 7/2015 | Pietrowicz | H04L 43/106 370/230 |
| 2015/0242008 | A1* | 8/2015 | Beckman | G06F 3/043 345/177 |
| 2015/0296033 | A1* | 10/2015 | Jung | G06Q 50/01 709/217 |
| 2015/0321098 | A1* | 11/2015 | van der Laan | H04N 21/2143 463/31 |
| 2016/0070356 | A1* | 3/2016 | Aguirre | G06F 3/017 345/156 |
| 2017/0134454 | A1* | 5/2017 | Bae | H04L 65/4069 |
| 2017/0264513 | A1* | 9/2017 | Pietrowicz | H04L 43/045 |

OTHER PUBLICATIONS

Zhu M, Mondet S, Morin G, Ooi WT, Cheng W. Towards peer-assisted rendering in networked virtual environments. InProceedings of the 19th ACM international conference on Multimedia Nov. 28, 2011 (pp. 183-192). ACM.*

Kwon et al., "The Development of Webpage Pre-loading Technology for Zero Latency Response on Cloud Mobile Web Browser", Korea Computer Congress 2012 Journal Collection, 2012, 7 pages, vol. 39, No. 1(D), Republic of Korea.

Korean Office Action for corresponding Korean Patent Application No. 10-2014-0013974 dated Feb. 22, 2016, citing the above reference(s).

Oh-Chul Kwon et al., "The Development of Webpage Pre-loading Technology for Zero Latency Response on Cloud Mobile Web Browser," Papers of Korea Computer Congress, 2012.

International Search Report for PCT/KR2014/011251 dated Feb. 2, 2015, citing the above reference(s).

European Search Report dated Apr. 28, 2016 corresponding to European Patent Application 148783947 citing the above reference(s).

* cited by examiner

S1350

S1340

CLOUD STREAMING SERVICE SYSTEM, AND METHOD AND APPARATUS FOR PROVIDING CLOUD STREAMING SERVICE

CROSS REFERENCE TO RELATED APPLICATIONS

This application claims the benefits of Korean Patent Application Nos. 10-2014-0013974 filed on Feb. 7, 2014 and 10-2014-0061841 filed on May 22, 2014 with the Korean Intellectual Property Office, which are hereby incorporated by reference in their entireties. Further, this application is the National Phase application of International Application No. PCT/KR2014/011251 filed on Nov. 21, 2014, which is incorporated herein by reference in its entirety.

TECHNICAL FIELD

The present invention relates, in general, to a cloud streaming service system and a method and apparatus for providing a cloud streaming service and, more particularly, to a cloud streaming service system and a method and apparatus for providing a cloud streaming service, which are capable of efficiently managing the resources of a cloud streaming server through pre-processing for a specific section of an application that requires many system resources and which are also capable of improving response speed even when a change in a screen in response to a user input is large by previously sending a screen including a section having a large change in the screen.

BACKGROUND ART

The rapid development of the Internet results in the rapid improvement of personal communication speed. The improvement of the communication speed provides an environment in which a large amount of data can be downloaded or uploaded by accessing a computer at a remote location or a computer at a remote location can be used as if the computer at the remote location was locally logged in to using a remote computer control program.

Furthermore, a screen virtualization-based cloud streaming service having an effect in which an application seems to be driven on the terminal of a client in such a manner that the application is driven on a server, a driving screen is compressed through video encoding and sent to the client, and the client plays back a received video has attracted attention.

A screen of an application that is driven on a cloud streaming system is updated with a predetermined frame cycle.

That is, a cloud streaming server executes an application, captures a screen corresponding to the result of the execution, encodes the captured screen, and sends the encoded screen to a terminal so that the result of the execution is sent to the terminal through streaming.

A very important problem is to manage the resource usage of a cloud streaming server because the resources of the cloud streaming server are shared by many users.

If a single application is executed on a cloud streaming server, a section actually having high resource usage is chiefly a predetermined specific section of a range in which the application is executed upon the execution of the application. In general, the length of the specific section is short. In this case, if the system resources of the cloud streaming server are not sufficient in the specific section, the operation of a cloud streaming system may become unstable and other users may be influenced. Accordingly, the cloud streaming server limits the maximum number of executable applications depending on the resource usage of the specific section.

For example, if an application is executed through a cloud streaming service, average CPU usage is about 5%. If the CPU usage of only a specific section is 30%, the resources of a cloud streaming system are unable to be efficiently used because the number of applications has to be limited in conformity with the specific section.

In particular, since a cloud streaming server needs to perform a streaming pipeline procedure of performing rendering, capture, encoding, and sending in each screen update cycle, the usage of system resources is high, and thus it is very important to efficiently use the system resources.

Furthermore, there are applications that use system resources in predetermined order. In connection with these applications, the sections in which many system resources are used are predetermined.

Accordingly, there is an urgent need for a new cloud streaming service technology that is capable of efficiently managing the system resources of a cloud streaming server when an application having high resource usage only in some specific sections is executed.

Furthermore, there is a difference in the amount of transmission depending on a change in a screen, and the time it takes to send a screen is longer if a change in the screen is large. As a result, a delay occurs until a client receives the screen after a user input. On the contrary, the time it takes to send a screen is shorter if a change in the screen is low, and a free band is generated until a user's subsequent input. Accordingly, a delay time can be minimized if data can be additionally sent using the free band.

Accordingly, there is an urgent need for a new cloud streaming service technology capable of reducing a response time by previously sending a screen including a section having a large change in the screen if a free band is present upon the provision of a cloud streaming service.

A related conventional technology includes Korean Patent Application Publication No. 10-2012-0072904 published on Jul. 4, 2012 (entitled "Method, Cloud computing server, and Cloud Computing System for Providing Game Service in Cloud Computing Environment").

A related conventional technology includes Korean Patent Application Publication No. 10-2000-0040087 published on Jul. 5, 2000 (entitled "Method of Controlling Playback Speed of Video using Scene Change Distribution").

DISCLOSURE

Technical Problem

An object of the present invention is to solve a problem in which the resources of a cloud streaming server are not efficiently used due to some specific sections of an application executed in a cloud streaming service by pre-processing each specific section in which many system resources of the application are used.

Another object of the present invention is to execute a larger number of applications in a single cloud streaming server when an application having high resource usage only in some sections is executed.

A further object of the present invention is to minimize a delay time occurring when a cloud streaming service is provided.

Yet another object of the present invention is to minimize a delay time in a section having a large change in a screen by recognizing the section having a large change in the screen, capturing and encoding the screen, and previously sending the captured and encoded screen in a free band.

Still another object of the present invention is to improve the sensory response speed of a user by sending only a different part when pre-captured data previously sent is different from data to be actually sent.

Technical Solution

In order to accomplish the above objects, in accordance with the present invention, there is provided a cloud streaming server, including: a storage unit configured to store a section clip in which an execution screen corresponding to a predetermined execution section of an application has been rendered; and a control unit configured to provide a cloud streaming service to a terminal by performing a normal streaming procedure of performing rendering, capture, encoding, and sending in each screen update cycle if a usage condition of the section clip has not been satisfied based on a determination made by considering an execution state of the application executed for the cloud streaming service and performing a shortcut streaming procedure for sending the section clip if the usage condition of the section clip has been satisfied.

The section clip may be generated by performing rendering, capture, and encoding during the execution section.

The shortcut streaming procedure may use fewer resources than the normal streaming procedure.

The section clip may be generated for a section in which the resources of the cloud streaming server are used at a predetermined level or higher by executing the application in advance.

Furthermore, in accordance with the present invention, there is provided a method of providing a cloud streaming service, including: storing a section clip in which an execution screen corresponding to a predetermined execution section of an application has been rendered; determining whether a usage condition of the section clip has been satisfied by considering an execution state of the application executed for a cloud streaming service; performing a normal streaming procedure of performing rendering, capture, encoding, and sending in each screen update cycle if the usage condition has not been satisfied; and performing a shortcut streaming procedure for sending the section clip if the usage condition has been satisfied.

The section clip may be generated by performing rendering, capture, and encoding during the execution section; and the shortcut streaming procedure may use fewer resources than the normal streaming procedure.

The section clip may be generated for a section in which the resources are used at a predetermined level or higher by executing the application in advance.

Furthermore, in accordance with the present invention, there is provided a cloud streaming service system, including: a cloud streaming server configured to provide a cloud streaming service by performing a normal streaming procedure for each screen update cycle if a usage condition of a section clip has not been satisfied based on a determination made by considering an execution state of an application and performing a shortcut streaming procedure for sending the section clip if the usage condition of the section clip has been satisfied; and a terminal configured to receive an execution result screen of the application corresponding to the cloud streaming service from the cloud streaming server.

Furthermore, in accordance with an embodiment of the present invention, there is provided a cloud streaming server, including: a control unit configured to generate real-time data by capturing and encoding an execution screen corresponding to a current section of an application executed for a cloud streaming service; a storage unit configured to store pre-captured data generated by capturing and encoding an execution screen corresponding to a predetermined pre-capture section of the application; and a communication unit configured to send the real-time data and send at least part of the pre-captured data.

The communication unit may send at least part of a portion of the pre-captured data that has not been sent during a free band until a subsequent input is received after sending real-time data corresponding to the current section.

The communication unit may send a portion of the pre-captured data that has not been sent if the pre-capture section has been entered before the pre-captured data is fully sent and a request to send real-time data corresponding to the pre-capture section is received.

The pre-capture section may include a section which has been retrieved based on a user input scenario and in which a change in a screen is larger than a predetermined level.

The pre-capture section may include a section which has been analyzed based on an execution history of the application and in which a change in a screen is larger than a predetermined level.

Furthermore, in accordance with an embodiment of the present invention, there is provided a terminal device, including: a communication unit configured to receive at least one of real-time data generated by capturing and encoding an execution screen corresponding to a current section of an application executed on a cloud streaming server and pre-captured data generated by capturing and encoding an execution screen corresponding to a predetermined pre-capture section of the application; and a control unit configured to provide a cloud streaming service by displaying any one of the real-time data and the pre-captured data on a screen.

The communication unit may receive at least part of a portion of the pre-captured data that has not been received during a free band until a subsequent input is sent after the real-time data corresponding to the current section has been received.

Furthermore, in accordance with an embodiment of the present invention, there is provided a cloud streaming service method, including: generating pre-captured data by capturing and encoding an execution screen corresponding to a predetermined pre-capture section of an application executed for a cloud streaming service; generating real-time data by capturing and encoding an execution screen corresponding to a current section of the application; sending the real-time data; and sending at least part of the pre-captured data.

Sending the at least part of the pre-captured data may include sending at least part of a portion of the pre-captured data that has not been sent during a free band until a subsequent input is received.

Sending the at least part of the pre-captured data may include sending the portion of the pre-captured data that has not been sent if the pre-capture section has been entered before the pre-captured data is fully sent and a request to send the pre-captured data is received.

Furthermore, in accordance with an embodiment of the present invention, there is provided a cloud streaming service method, including receiving real-time data generated by capturing and encoding an execution screen corresponding to a current section of an application executed on a cloud streaming server; receiving at least part of pre-captured data generated by capturing and encoding an execution screen corresponding to a predetermined pre-capture section of the application; and providing a cloud streaming service by displaying any one of the real-time data and the pre-captured data on a screen.

Receiving the at least part of the pre-captured data may include receiving at least part of a portion of the pre-captured data that has not been received during a free band until a subsequent input is sent.

Advantageous Effects

In accordance with the present invention, a problem in which the resources of a cloud streaming server are not efficiently used due to some specific sections of an application executed in a cloud streaming service by pre-processing each specific section in which many system resources of the application are used can be overcome.

Furthermore, in the present invention, in particular, a larger number of applications can be executed on a single cloud streaming server when an application having high resource usage only in some sections is executed.

Furthermore, in the present invention, a delay time occurring when a cloud streaming service is provided can be minimized.

Furthermore, in the present invention, a delay time in a section having a large change in a screen can be minimized by recognizing the section having a large change in the screen, capturing and encoding the screen, and previously sending the captured and encoded screen in a free band.

Furthermore, in the present invention, the sensory response speed of a user can be improved by sending only a different part when pre-captured data previously sent is different from data to be actually sent.

MODE FOR INVENTION

Preferred embodiments of the present invention are described in detail below with reference to the accompanying drawings. Detailed descriptions of well-known functions and configurations that may make the gist of the present invention obscure will be omitted in the following description and the accompanying drawings. Furthermore, it should be noted that the same components are designated by the same reference symbols throughout the drawings as much as possible.

Terms and words that are used in the present specification and claims should not be restrictively interpreted as having common and dictionary meanings, but should be interpreted as having meanings and concepts in conformity with the technical spirit of the present invention based on the principle in which an inventor can appropriately define the concepts of terms in order to describe his or her invention in the best way. Accordingly, the embodiments described in the present specification and the configurations illustrated in drawings are merely preferred embodiments of the present invention and do not represent all the technical spirit of the present invention, it should be understood that there may be various equivalents and modifications that may replace the embodiments and the configurations at the time at which the present application is filed. The terms "first" and "second" are used to describe various components. These terms are used only to distinguish one component from another component, but are not used to limit those components.

Figure 1:
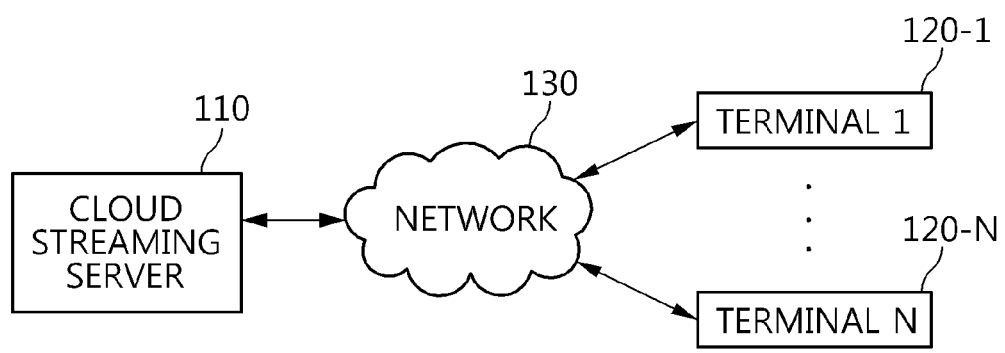
FIG. 1 is a block diagram illustrating a cloud streaming service system according to an embodiment of the present invention.

FIG. 1 is a block diagram illustrating a cloud streaming service system according to an embodiment of the present invention.

Referring to FIG. 1, the cloud streaming service system according to this embodiment of the present invention includes a cloud streaming server 110, terminals 120-1, . . . , 120-N, and a network 130.

The cloud streaming server 110 executes an application in response to a request from any one of the terminals 120-1, . . . , 120-N, and provides any one of the terminals 120-1, . . . , 120-N with the execution result screen of the application corresponding to the result of the execution of the application. In this case, the execution result screen of the application may be generated by performing a streaming pipeline procedure of capture, encoding, and sending in each screen update cycle. The streaming pipeline procedure may be viewed as including rendering, capture, encoding, and sending.

In the following description, the screen update cycle may be the time it takes for a screen to be updated, or may be the number of times that a screen is updated for 1 second. For example, the unit of the screen update cycle may be "s" or "1/s."

The cloud streaming server 110 stores a section clip in which an execution screen corresponding to a predetermined execution section of an application has been rendered, and determines the usage condition of the section clip by considering the execution state of the application executed for a cloud streaming service.

In this case, if it is determined that the usage condition of the section clip has not been satisfied, the cloud streaming server 110 performs a normal streaming procedure of performing rendering, capture, encoding, and sending in each screen update cycle.

In this case, if it is determined that the usage condition of the section clip has been satisfied, the cloud streaming server 110 performs a shortcut streaming procedure for sending the section clip.

As described above, the cloud streaming server 110 can efficiently use server resources by selectively performing the normal streaming procedure or the shortcut streaming procedure depending on whether the usage condition of the section clip has been satisfied or not.

That is, there are many cases where many system resources are required only in some predetermined sections of each application. In these cases, the number of applications executed on a server is limited due to the sections that require many system resources.

In accordance with the present invention, more cloud streaming applications can be executed under predetermined system resources in such a way that section clips corresponding to some sections that require many system resources are previously generated and the shortcut streaming procedure for directly sending a corresponding section clip, rather than the normal streaming procedure of performing rendering, capture, encoding, and sending, is performed in a corresponding section when an application is executed.

For example, if the total range of a fairy tale reading application is 5 minutes and average CPU usage is 5% but CPU usage is 30% for first 30 seconds after the start of the execution of the fairy tale reading application, the maximum number of applications that can be stably served by a server is 2 or 3. When an embodiment of the present invention is applied, resources considerably smaller than resources for the normal streaming procedure executed in the corresponding section (i.e., for the first 30 seconds) of the fairy tale reading application can be taken up by generating a section clip corresponding to the corresponding section and directly sending the generated section clip when the corresponding section is executed. For example, assuming that CPU usage is 10% when the section clip is directly sent for first 30 seconds after the start of the execution of the application, the maximum number of applications that may be stably served is increased to 7 or 8.

Each of the terminals 120-1, . . . , 120-N receives an execution result screen of an application, corresponding to the cloud streaming service, from the cloud streaming server 110, and provides the execution result screen to a user.

Each of the terminals 120-1, . . . , 120-N is an apparatus that is connected to a communication network and executes an application based on a cloud computing system. The terminal 120-1, . . . , 120-N are not limited to mobile communication terminals, but may include a variety of types of terminals, such as all types of information communication devices, multimedia terminals, wired terminals, fixed-type terminals, and Internet Protocol (IP) terminals. Furthermore, the terminals 120-1, . . . , 120-N may be mobile terminals having various mobile communication specifications, such as mobile phones, portable multimedia players (PMPs), mobile Internet devices (MIDs), smart phones, desktops, table PCs, laptops, net books, personal digital assistants (PDAs), smart TVs, and information communication devices.

The network 130 functions to provide a path through which data is transferred between the cloud streaming server 110 and the terminals 120-1, . . . , 120-N, and is based on a concept including both existing networks and networks to be developed in the future. For example, the network 130 may be any one of a wired/wireless short-distance communication network for providing communication between various information devices within a limited area, a mobile communication network for providing communication between moving bodies and between a moving body and the outside of the moving body, a satellite communication network for providing communication between earth stations using a satellite and a wired/wireless communication network, or a combination of two or more thereof. The transport standard of the network 130 is not limited to existing transport standards, and may include all types of transport standards that will be developed in the future. Furthermore, in FIG. 1, the network 130 used between the cloud streaming server 110 and the terminals 120-1, . . . , 120-N may be different from or the same as a network used between the terminals 120-1, . . . , 120-N.

Figure 2:
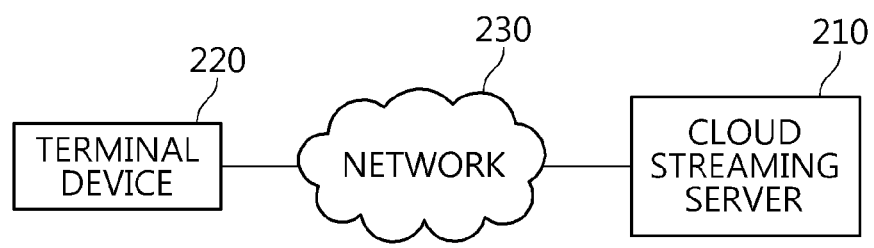
FIG. 2 is a block diagram illustrating a cloud streaming service system according to another embodiment of the present invention.

FIG. 2 is a block diagram illustrating a cloud streaming service system according to another embodiment of the present invention.

Referring to FIG. 2, the cloud streaming service system according to this embodiment of the present invention includes a cloud streaming server 210, a terminal device 220, and a network 230.

The cloud streaming server 210 generates real-time data by capturing and encoding an execution screen corresponding to the current section of the application executed for the cloud streaming service, stores pre-captured data generated by capturing and encoding the execution screen corresponding to the predetermined pre-capture section of the application, sends the real-time data, and sends at least part of the pre-captured data.

In this case, the cloud streaming server 210 may send at least part of the pre-captured data, which has not been sent yet, during a free band until receiving a subsequent input after sending the real-time data corresponding to the current section.

In this case, if the application enters the pre-capture section before the overall pre-captured data is sent and the real-time data corresponding to the pre-capture section is requested to be sent, the cloud streaming server 210 may send the part of the pre-captured data that has not been sent.

In this case, if the real-time data to be sent is different from the pre-captured data when the application enters the pre-capture section, the cloud streaming server 210 may send only the part of the real-time data that is different from the pre-captured data.

In this case, the pre-capture section may be a section which has been retrieved based on a user input scenario and in which a change in a screen is larger than a predetermined level.

Alternatively, the pre-capture section may be a section which has been analyzed based on the execution history of the application and in which a change in a screen is larger than a predetermined level.

Alternatively, the pre-capture section may be a section which has been analyzed based on the execution history of the application and in which the number of entries of users is larger than a predetermined level.

The terminal device 220 receives at least any one of the real-time data generated by capturing and encoding the execution screen corresponding to the current section of the application executed on the cloud streaming server 210 and pre-captured data generated by capturing and encoding the execution screen corresponding to the predetermined pre-capture section of the application, and displays any one of the real-time data and the pre-captured data on a screen, thereby providing a cloud streaming service.

In the following description, the terminal device 220 is illustrated as being a mobile communication terminal that is connected to a communication network and can upload or download content based on a cloud computing system. However, the terminal device 220 is not limited to a mobile communication terminal, but may be applied to a variety of types of terminals, such as all types of information communication devices, a multimedia terminal, wired terminals, fixed-type terminals, and IP terminals. Furthermore, the terminal device 120 may be advantageously used for mobile terminals having various mobile communication specifications, such as a mobile phone, a PMP, an MID, a smart phone, a desktop, a table PC, a laptop, a net book, a PDA, smart TV, and an information communication device.

In this case, the terminal device 220 may receive at least part of the portion of the pre-captured data that has not been received during a free band until sending a subsequent input after receiving real-time data corresponding to the current section.

In this case, if the application enters the pre-capture section before the overall pre-captured data is received, the terminal device 220 may receive the portion of the pre-captured data that has not been received.

In this case, the terminal device 220 may display the pre-captured data on the screen if the application has entered the pre-capture section, and may display the real-time data on the screen if the application has not entered the pre-capture section.

The network 230 functions to provide a path through which data is transferred between the cloud streaming server 210 and the terminal device 220, and is based on a concept including both existing networks and networks to be developed in the future. For example, the network 230 may be any one of a wired/wireless short-distance communication network for providing communication between various information devices within a limited area, a mobile communication network for providing communication between moving bodies and between a moving body and the outside of the moving body, a satellite communication network for providing communication between earth stations using a satellite and a wired/wireless communication network, or a combination of two or more thereof. The transport standard of the network 230 is not limited to existing transport standards, but may include all types of transport standards to be developed in the future.

Figure 3:
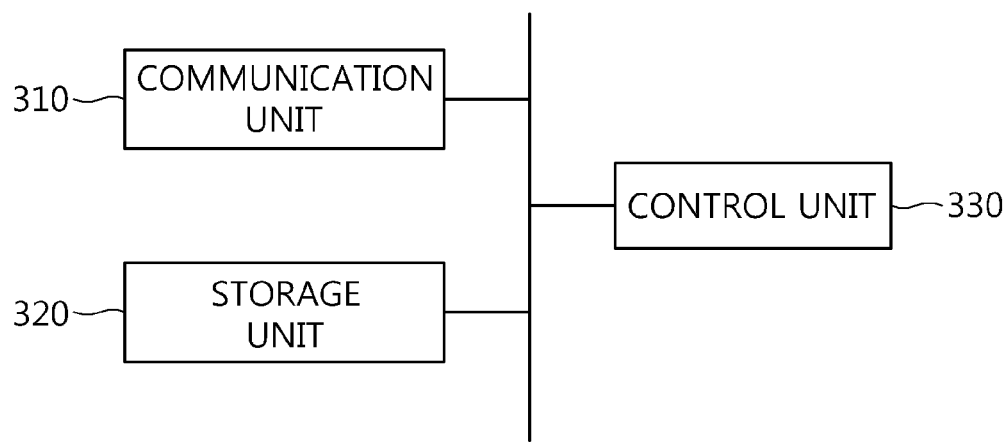
FIG. 3 is a block diagram illustrating an example of the cloud streaming server of FIG. 1.

FIG. 3 is a block diagram illustrating an example of the cloud streaming server of FIG. 1.

Referring to FIG. 3, the cloud streaming server 110 of FIG. 1 includes a communication unit 310, a storage unit 320, and a control unit 330.

The storage unit 320 stores a section clip in which an execution screen corresponding to a predetermined execution section of an application has been rendered.

In this case, the section clip may have been generated by performing rendering, capture, and encoding during the execution section.

In this case, the section clip may have been generated for a section in which the resources of a cloud streaming server are used at a predetermined level or higher by previously executing a corresponding application.

In this case, the section clip may have been generated in accordance with the quality assurance (QA) of the corresponding application. In general, since an application for a cloud streaming service undergoes a QA step, a section clip may be previously generated by performing rendering, capture, and encoding on a specific section having high resource usage at the QA step, and the section clip may be used to lower resource usage upon the execution of the application while the section clip is managed along with meta information corresponding to the QA.

In this case, the execution section may be identically set with respect to the same application. That is, since the same fairy tale reading applications may have the same sections having high resource usage, it is not necessary to check an execution section having high resource usage again with respect to the same applications.

In this case, the execution section may be independently set for each application. That is, since a section having high resource usage may vary depending on the application, it is required that a section suitable for the corresponding application is set as the execution section and then a section clip is generated.

The control unit 330 may determine whether the usage condition of a section clip has been satisfied by considering the execution state of an application executed for a cloud streaming service. If it is determined that the usage condition of the section clip has not been satisfied, the control unit 330 performs the normal streaming procedure of performing rendering, capture, encoding, and sending in each screen update cycle.

If it is determined that the usage condition of the section clip has been satisfied, the control unit 330 performs the shortcut streaming procedure for sending the section clip.

As described above, the control unit 330 may minimize the influence of a section having high resource usage by selectively performing the normal streaming procedure or the shortcut streaming procedure even when the section has high resource usage, and may provide the cloud streaming service to a terminal while using server resources more efficiently.

In this case, the shortcut streaming procedure may use fewer resources of a cloud streaming server than the normal streaming procedure.

In this case, the usage condition of the section clip may relate to whether the execution timing of a corresponding application belongs to a predetermined section. That is, the section clip may have been generated for a predetermined execution section of an application. If the execution timing of the application reaches the predetermined execution section, the control unit may determine that the usage condition of the section clip has been satisfied.

The communication unit 310 functions to send and receive information related to a plurality of terminals over a communication network, such as the network of FIG. 1. In particular, the communication unit 310 according to an embodiment of the present invention receives a request for a cloud streaming service from a terminal, and provides the terminal with an execution result screen of an application corresponding to the cloud streaming service requested by the terminal.

The storage unit 320 may store a variety of types of information, generated in a cloud streaming service process according to an embodiment of the present invention, in addition to a section clip.

In some embodiments, the storage unit 320 may be configured independently of the cloud streaming server 110, and may support a function for a cloud streaming service. In this case, the storage unit 320 may operate as separate high-capacity storage, and may include a control function for executing an operation.

Furthermore, the cloud streaming server 110 configured as described above may be implemented using one or more servers.

Memory may be mounted on the cloud streaming server 110 and store information. In an implementation example, the memory may be a computer-readable medium. In an implementation example, the memory may be a volatile memory unit. In another implementation example, the memory may be a nonvolatile memory unit. In an implementation example, the storage device may be a computer-readable medium. In various different implementation examples, the storage unit may include, for example, a hard disk device, an optical disk device, or another high-capacity storage device.

Figure 4:
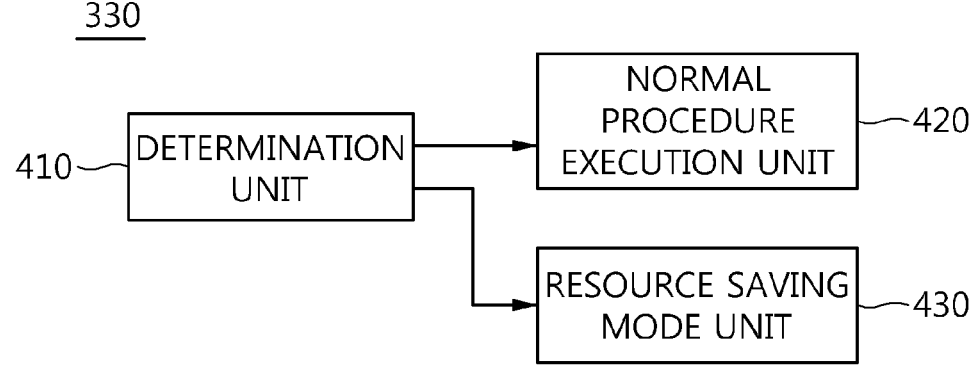
FIG. 4 is a block diagram illustrating an example of a control unit of FIG. 3.

FIG. 4 is a block diagram illustrating an example of the control unit of FIG. 3.

Referring to FIG. 4, the control unit 330 of FIG. 3 includes a determination unit 410, a normal procedure execution unit 420, and a resource saving mode unit 430.

The determination unit 410 determines whether the usage condition of a section clip has been satisfied. In this case, the usage condition of the section clip may relate to whether the execution timing of a corresponding application reaches a predetermined section. For example, if a section corresponding to a period of 30 seconds from 5 minutes after the start of the execution of a fairy tale reading application has been set as an execution section having the highest resource usage, the usage condition of a section clip may relate to whether execution timing of the fairy tale reading application is between 5 minutes and 5½ minutes after the start of the execution of the fairy tale reading application.

The normal procedure execution unit 420 performs the normal streaming procedure of performing rendering, capture, encoding, and sending.

The resource saving mode unit 430 performs the shortcut streaming procedure for sending a section clip. In this case, the shortcut streaming procedure needs to send only a section clip in which rendering, capture, and encoding have already been performed, and thus takes up fewer resources than the normal streaming procedure of performing rendering, capture, encoding, and sending.

Figure 5:
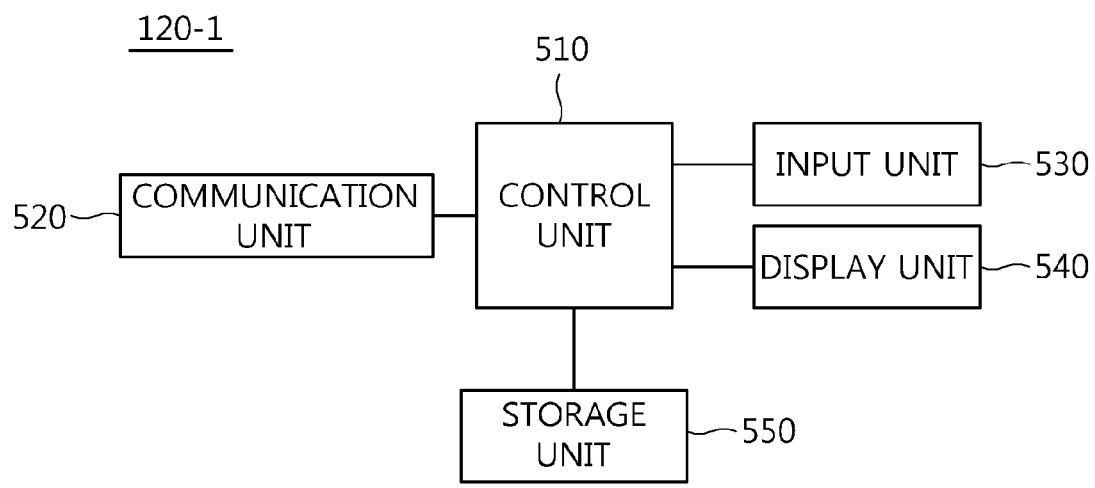
FIG. 5 is a block diagram illustrating an example of the terminal of FIG. 1.

FIG. 5 is a block diagram illustrating an example of the terminal of FIG. 1.

Referring to FIG. 5, the terminal includes a control unit 510, a communication unit 520, an input unit 530, a display unit 540, and a storage unit 550.

The input unit 530 may receive a variety of types of information, such as numerical and alphabetical information, and sends a signal, received in relation to the settings of various functions or the control of a function of the terminal, to the control unit 510. Furthermore, the input unit 530 may be configured to include at least one of a keypad and a touch pad that generates an input signal according to a user's touch or manipulation. In this case, the input unit 530 may be configured in the form of a single touch panel (or touch screen) along with the display unit 540, and may perform both input and display functions. Furthermore, all types of input means to be developed in the future in addition to input devices, such as a keyboard, a keypad, a mouse and a joystick, may be used as the input unit 530. In particular, the input unit 530 according to the present invention may send an input signal for requesting a cloud streaming service from the cloud streaming server 110 or receiving an execution result screen of an application from the cloud streaming server 110 to the control unit 510.

The display unit 540 displays information about a series of operation states and operation results generated while a function of the terminal is being performed. Furthermore, the display unit 540 may display the menu of the terminal and user data input by a user. In this case, the display unit 540 may be configured using a liquid crystal display (LCD), a thin film transistor LCD (TFT LCD), a light-emitting diode (LED), an organic LED (OLED), an active matrix OLED (AMOLED), a retina display, a flexible display, or a three-dimensional (3D) display. In this case, if the display unit 540 is configured in the form of a touch screen, the display unit 540 may perform some or all of the functions of the input unit 530. In particular, the display unit 540 according to the present invention may display information related to a cloud streaming service on a screen.

The storage unit 550 is a unit configured to store data, and includes a primary memory device and a secondary memory device and stores application programs required to drive the functions of the terminal. The storage unit 550 may basically include a program area and a data area. If the functions of the terminal are activated in response to a request from a user, the terminal executes a corresponding application program under the control of the control unit 510 and provides a corresponding function. In particular, the storage unit 550 according to the present invention stores an operating system (OS) for booting up the terminal and a program for requesting a cloud streaming service from the cloud streaming server 110 or receiving the execution result of an application from the cloud streaming server 110.

The communication unit 520 performs a function for sending and receiving data to and from the cloud streaming server 110 over a network. In this case, the communication unit 520 may include a radio frequency (RF) transmission means for performing up-conversion and amplification on the frequency of a sent signal and an RF reception means for performing low-noise amplification on a received signal and performing down-conversion on the frequency of the received signal. The communication unit 520 may include at least one of a wireless communication module (not illustrated) and a wired communication module (not illustrated). Furthermore, the wireless communication module is a component for sending and receiving data according to a wireless communication method. If the terminal uses wireless communication, data may be sent and received to and from the cloud streaming server 110 using any one of a wireless network communication module, a wireless local area network (WLAN) communication module, and a wireless personal area network (WPAN) communication module. Furthermore, the wired communication module functions to send and receive data via a wired line. The wired communication module may access a communication network via a wired line and send and receive data to and from the cloud streaming server 110. That is, the terminal may access a communication network using the wireless communication module or the wired communication module, and may send and receive data to and from the cloud streaming server 110 over the communication network. In particular, the communication unit 520 according to the present invention requests the execution of an application through communication with the cloud streaming server 110, and sends and receives data necessary to receive an execution result screen of the application.

The control unit 510 may be a process device for driving an operating system (OS) and each component. For example, the control unit 510 may control an overall process for accessing the cloud streaming server 110. For example, when the terminal accesses the cloud streaming server 110 through a separate service application, the control unit 510 may control an overall process for executing a service application in response to a request from a user and perform control so that a service use request is sent to the cloud streaming server 110 simultaneously with the execution of the service application. In this case, the control unit 510 may perform control so that terminal information for user authentication is also sent.

Figure 6:
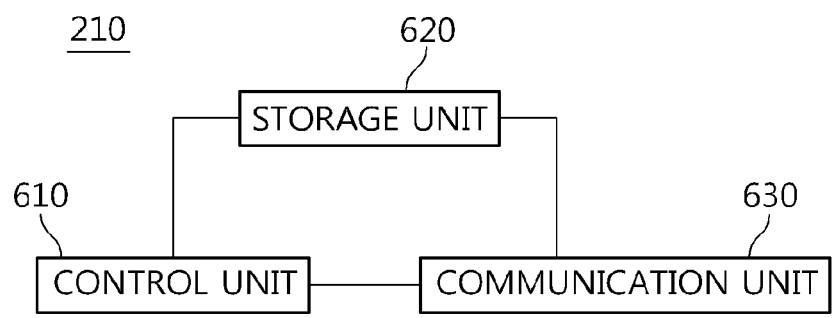
FIG. 6 is a block diagram illustrating an example of the cloud streaming server of FIG. 2.

FIG. 6 is a block diagram illustrating an example of the cloud streaming server of FIG. 2.

Referring to FIG. 6, the cloud streaming server 210 of FIG. 2 includes a control unit 610, a storage unit 620, and a communication unit 630.

The control unit 610 may be a process device for driving an OS and each component. In particular, the control unit 610 according to the present invention generates real-time data by capturing and encoding an execution screen corresponding to the current section of an application executed for a cloud streaming service.

In this case, the real-time data may be data generated by capturing and encoding a current screen in which the application executed in response to the user input is being executed. That is, the real-time data may continue to be generated in real time as the application is executed.

The storage unit 620 is a unit configured to store data, and includes a primary storage device and a secondary memory device and stores application programs for driving the functions of the cloud streaming server. The storage unit 620 may basically include a program area and a data area. In this case, when each function is activated in response to a request from a user, the cloud streaming server provides each function by executing a corresponding application program under the control of the control unit 610. In particular, the storage unit 620 according to the present invention stores pre-captured data generated by capturing and encoding an execution screen corresponding to a predetermined pre-capture section of the application.

In this case, the storage unit 620 includes magnetic media, such as a hard disk, a floppy disk and a magnetic tape, optical media, such as compact disk read only memory (CD-ROM) and a digital video disk (DVD), magneto-optical media, such as a floptical disk, read only memory (ROM), random access memory (RAM), and flash memory.

In some embodiments, a pre-capture section may be a section which has been retrieved based on a user input scenario and in which a change in a screen is larger than a predetermined level.

That is, a scenario that is predicted for an application and that is based on a user input is generated. When a screen is changed according to the scenario, a section in which a change in a screen is larger than a predetermined level may be set as a pre-capture section. For example, if 50% or larger of a screen is changed based on a user input scenario, a corresponding section may be set as a pre-capture section.

Alternatively, a pre-capture section may be a section which has been analyzed based on the execution history of an application and in which a change in a screen is larger than a predetermined level.

That is, an execution history indicative of the history of an application executed in the past may be stored, and a section in which a change in a screen is larger than a predetermined level in the execution history may be set as a pre-capture section. For example, a section in which 50% or larger of a screen is changed in an execution history may be set as a pre-capture section.

Alternatively, a pre-capture section may be a section which has been analyzed based on the execution history of the application and in which the number of entries of users is larger than a predetermined level.

That is, a section in which users make many entries, i.e., many requests are generated, may be set as a pre-capture section by analyzing an execution history.

Alternatively, a pre-capture section may be set by combining one or more of the aforementioned three types of criteria.

The communication unit 630 functions to send and receive data to and from the cloud streaming server over a network. In this case, the communication unit 630 includes RF transmission means for performing up-conversion and amplification on the frequency of a sent signal, and an RF reception means for performing low-noise amplification on a received signal and performing down-conversion on the frequency of the received signal. The communication unit 630 may include at least one of a wireless communication module (not illustrated) and a wired communication module (not illustrated). Furthermore, the wireless communication module is a component for sending and receiving data according to a wireless communication method. If the cloud streaming server uses wireless communication, the communication unit 630 may send and receive data to and from the terminal device using any one of a wireless network communication module, a WLAN communication module, and a WPAN communication module. Furthermore, the wired communication module functions to send and receive data via a wired line. The wired communication module may access the network via a wired line, and may send and receive data to and from the terminal device. That is, the cloud streaming server 210 may access the network using the wireless communication module or the wired communication module, and may send and receive data to and from the terminal device over the network. In particular, the communication unit 630 according to an embodiment of the present invention may send the real-time data and send at least part of the pre-captured data.

In this case, the communication unit 630 may send and receive data using various communication methods including wired methods and wireless methods.

In this case, the communication unit 630 may include a plurality of communication modules for sending data according to different communication methods.

In some embodiments, the communication unit 630 may send at least part of the portion of the pre-captured data that has not been sent during a free band until a subsequent input is received after sending real-time data corresponding to the current section.

That is, the communication unit 630 may first send real-time data generated by capturing and encoding a screen that has been requested by the terminal device along with a user input, and then may send the pre-captured data if a free band is present until a subsequent input is received. If a free band is not present, the communication unit 630 may send only the real-time data. In this case, although the overall pre-captured data is not sent, the communication unit 630 may send part of the pre-captured data corresponding to the free band. The communication unit 630 may send the real-time data after receiving a subsequent input, and may send the remaining part of the pre-captured data that has not been sent if a free band is present.

In some embodiments, if an application enters a pre-capture section before the overall pre-captured data is sent and real-time data corresponding to the pre-capture section is requested to be sent, the communication unit 630 may send the portion of the pre-captured data that has not been sent.

That is, if the overall pre-captured data has been sent when the application enters the pre-capture section, the terminal device may provide a cloud streaming service using the pre-captured data received instead of real-time data, and a free band may be present because the cloud streaming server has no data to be sent. In contrast, if the overall pre-captured data has not been sent when the application enters the pre-capture section, the cloud streaming server may send the remaining part of the pre-captured data that has not yet been sent so that the terminal device can provide a cloud streaming service.

In some embodiments, if real-time data to be sent is different from the pre-captured data when the pre-capture section is entered, the communication unit 630 may send only the part of the real-time data that is different from the pre-captured data.

In this case, pre-captured data corresponding to a pre-capture section that has been predicted based on a user input scenario or analyzed based on the execution history of an application may not be fully identical with real-time data that has actually been requested. In this case, it may be efficient to provide a cloud streaming service by sending only a different part, rather than by sending the overall real-time data, and combining the different part with the pre-captured data that has been previously sent. Accordingly, when the application enters the pre-capture section, the different part between the real-time data and the pre-captured data may be recognized, and only the different part may be sent.

Figure 7:
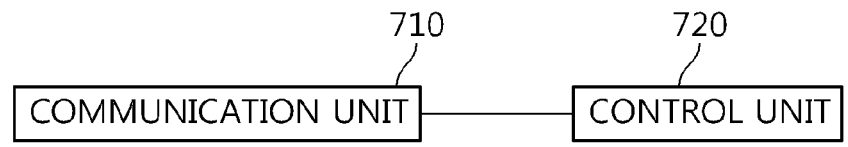
FIG. 7 is a block diagram illustrating an example of the terminal device of FIG. 2.

FIG. 7 is a block diagram illustrating an example of the terminal device of FIG. 2.

Referring to FIG. 7, the terminal device 200 of FIG. 2 includes a communication unit 710, and a control unit 720.

The communication unit 710 functions to send and receive data to and from the cloud streaming server over the network. In this case, the communication unit 710 includes an RF transmission means for performing up-conversion and amplification on the frequency of a sent signal, and an RF reception means for performing low-noise amplification on a received signal and performing down-conversion on the frequency of the received signal. The communication unit 710 may include at least one of a wireless communication module (not illustrated) and a wired communication module (not illustrated). Furthermore, the wireless communication module is a component for sending and receiving data according to a wireless communication method. If the terminal device uses wireless communication, the communication unit 710 may send and receive data to and from the cloud streaming server using any one of a wireless network communication module, a WLAN communication module, and a WPAN communication module. Furthermore, the wired communication module functions to send and receive data via a wired line. The wired communication module may access the network via a wired line, and may send and receive data to and from the cloud streaming server. That is, the terminal device 220 may access the network using the wireless communication module or the wired communication module, and may send and receive data to and from the cloud streaming server over the network. In particular, the communication unit 710 according to the present invention may receive at least one of real-time data generated by capturing and encoding an execution screen corresponding to the current section of an application executed on the cloud streaming server and pre-captured data generated by capturing and encoding an execution screen corresponding to a predetermined pre-capture section of the application.

In this case, the communication unit 710 may send and receive data using various communication methods including wired methods and wireless methods.

In this case, the communication unit 710 may include a plurality of communication modules for sending data according to different communication methods.

In this case, real-time data may be data generated by capturing and encoding a current screen in which an application executed in response to a user input is being executed. That is, real-time data continues to be received in real time as the application is executed.

In this case, a pre-capture section may be a section which has been retrieved based on a user input scenario and in which a change in a screen is larger than a predetermined level.

That is, a scenario that is predicted for an application and that is based on a user input is generated. When a screen is changed according to the scenario, a section in which a change in the screen is larger than a predetermined level may be set as a pre-capture section. For example, if 50% or larger of a screen is changed based on a user input scenario, a corresponding section may be set as a pre-capture section.

Alternatively, the pre-capture section may be a section which has been analyzed based on the execution history of an application and in which a change in a screen is larger than a predetermined level.

That is, an execution history indicative of the history of an application executed in the past may be stored, and a section in which a change in a screen is larger than a predetermined level in the execution history may be set as a pre-capture section. For example, a section in which 50% or larger of a screen is changed in an execution history may be set as a pre-capture section.

Alternatively, a pre-capture section may be a section which has been analyzed based on the execution history of the application and in which the number of entries of users is larger than a predetermined level.

That is, a section in which users make many entries, i.e., many requests are generated, may be set as the pre-capture section by analyzing an execution history.

Alternatively, the pre-capture section may be set by combining one or more of the aforementioned three types of criteria.

In some embodiments, the communication unit 710 may receive at least part of the portion of the pre-captured data that has not been received during a free band until a next is sent after receiving a real-time data corresponding to the current section.

That is, the communication unit 710 may first receive real-time data generated by capturing and encoding a screen that has been requested along with a user input, and then may receive pre-captured data if a free band is present until a subsequent input is sent. If a free band is not present, the communication unit 710 may receive only the real-time data. In this case, although the overall pre-captured data is not received, the communication unit 710 may receive part of the pre-captured data corresponding to the free band. The communication unit 710 may receive real-time data after sending a subsequent input, and may receive the remaining part of the pre-captured data that has not been received if a free band is present.

In some embodiments, if the pre-capture section is entered before the overall pre-captured data is received, the communication unit 710 may receive the portion of the pre-captured data that has not been received.

That is, if the overall pre-captured data has been received when the pre-capture section is entered, the control unit 720 may provide a cloud streaming service using the pre-captured data received instead of real-time data. In this case, a free band may be present because the cloud streaming server has not data to be sent. In contrast, if the overall pre-captured data has not yet been received when the pre-capture section is entered, the communication unit 710 may receive the remaining part of the pre-captured data that has not yet been received and provide a cloud streaming service.

In this case, if real-time data is different from the pre-captured data when the pre-capture section is entered, the communication unit 710 may receive only the part of the real-time data that is different from the pre-captured data.

The control unit 720 may be a process device for driving an operating system (OS) and each component. For example, the control unit 720 may control an overall process for accessing the cloud streaming server. For example, if the terminal device accesses the cloud streaming server through a separate service application, the control unit 720 may control an overall process for executing a service application in response to a request from a user and perform control so that the service use request is sent to the cloud streaming server simultaneously with the execution of the service application. In this case, the control unit 720 may perform control so that terminal information for user authentication is also sent. In particular, the control unit 720 according to an embodiment of the present invention may provide a cloud streaming service by displaying any one of real-time data and pre-captured data on a screen of a display unit.

In this case, the display unit (not illustrated) displays information about a series of operation states and operation results generated while a function of the terminal device is performed. Furthermore, the display unit may display the menu of the terminal device and a user data input by a user. In this case, the display unit may be configured using an LCD, a TFT LCD, an LED, an OLED, an MOLED, a retina display, a flexible display, or a 3D display. In this case, if the display unit is configured in the form of a touch screen, the display unit may perform some or all of the functions of an input unit (not illustrated). In particular, the display unit according to an embodiment of the present invention may provide a cloud streaming service by displaying real-time data or pre-captured data on a screen under the control of the control unit 720.

In some embodiments, the control unit 720 may display the pre-captured data on a screen if the application has entered the pre-capture section, and may display the real-time data on the screen if the application has not entered the pre-capture section.

That is, if pre-captured data corresponding to a pre-capture section is available, the control unit 720 may display the pre-captured data, thereby being able to minimize a delay time.

In this case, if an application has entered a pre-capture section but real-time data is different from pre-captured data, the control unit 720 may provide a cloud streaming service by combining a portion, which belongs to the real-time data received by the communication unit 710 and which is different from the pre-captured data, with the pre-captured data and then displaying the result of the combination on a screen.

In this case, the pre-captured data corresponding to the pre-capture section that has been predicted based on a user input scenario or analyzed based on the execution history of the application may not be identical with real-time data that has actually been requested. In this case, it may be efficient to provide a cloud streaming service by receiving only a different part, rather than by receiving the overall real-time data, and combining the different part with the pre-captured data that has been previously received. Accordingly, when the application enters the pre-capture section, the cloud streaming server may recognize the different part between the real-time data and the pre-captured data and send only the different part. The control unit 720 may provide the cloud streaming service by combining the different part with the pre-captured data.

Figure 8:
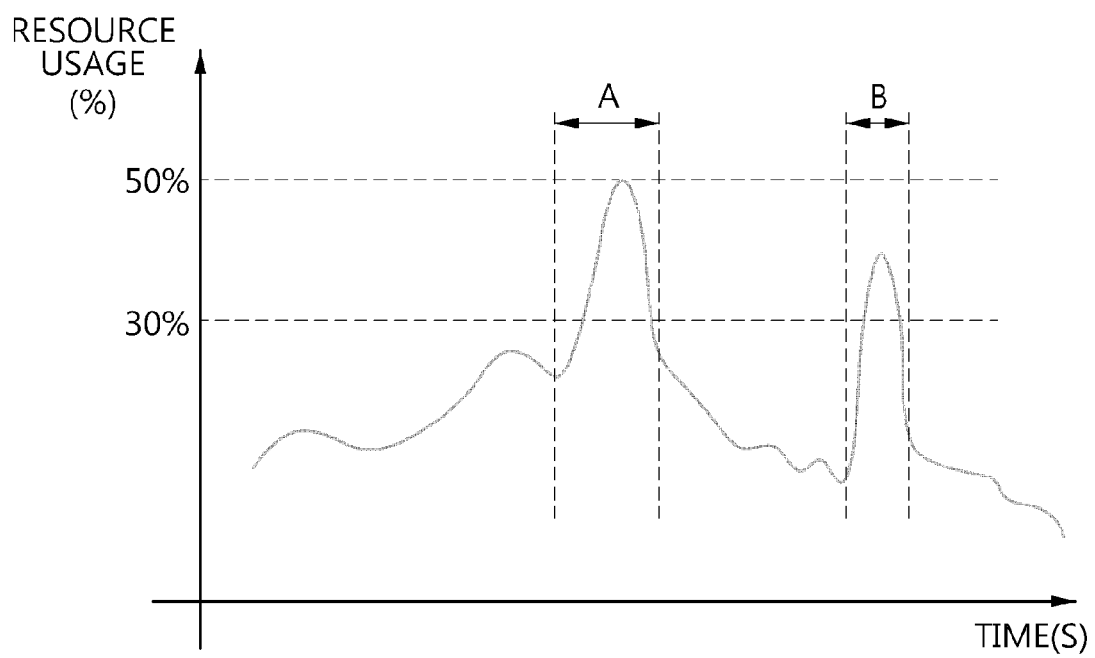
FIG. 8 is a graph illustrating changes in the resource usage of an application having high resource usage only in some sections.

FIG. 8 is a graph illustrating changes in the resource usage of an application having high resource usage only in some sections.

Referring to FIG. 8, it can be seen that resource usage according to the execution time of an application is determined and the sections in which resource usage exceeds 30% are sections A and B.

In general, when a cloud streaming service is provided, a server may barely execute two applications because the resource usage of the application is almost 50% (when the normal streaming procedure is performed) in a specific section (i.e., the section A).

In accordance with the present invention, if section clips corresponding to the section A and the section B are previously generated and only the section clips are sent (in this case, if resource usage is lower than 30%) without performing the normal streaming procedure of performing rendering, capture, encoding, and sending in the section A and the section B, the server may run three applications without any problem.

Execution sections, such as the section A and the section B, need to be differently set in the case of different applications. In this case, the execution sections may be identically set with respect to the same application.

FIGS. 9 to 12 are diagrams illustrating examples of changes in a cloud streaming service screen according to embodiments of the present invention.

Referring to FIGS. 9 to 12, a cloud streaming service screen according to an embodiment of the present invention may be divided into upper left parts 910, 1010, 1110 and 1210, lower left parts 920, 1020, 1120 and 1220, and right parts 930, 1030, 1130 and 1230.

An example in which a screen is sequentially changed from FIG. 9 to FIG. 12 is described below.

Figure 11:
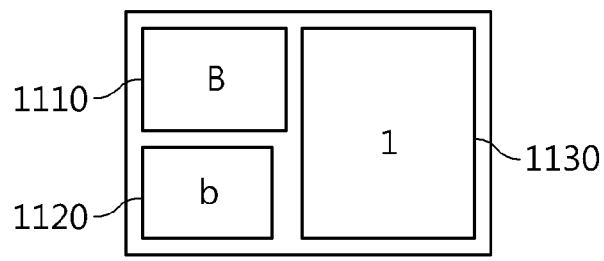
Figure 12:
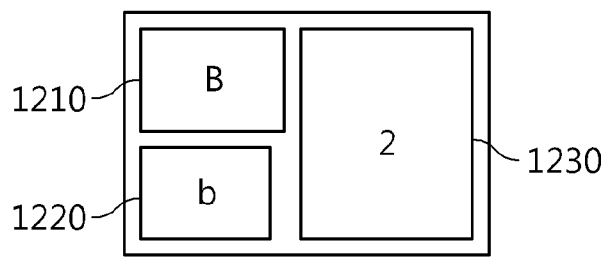

When the screen is changed from FIG. 11 to FIG. 12, the right part is changed from "1" 1130 to "2" 1230. In this case, since about half of the screen is changed, a changed section may be set as a pre-capture section based on a user input scenario or execution history. It is hereinafter assumed that the section changed from FIG. 11 to FIG. 12 is a pre-capture section.

Figure 9:
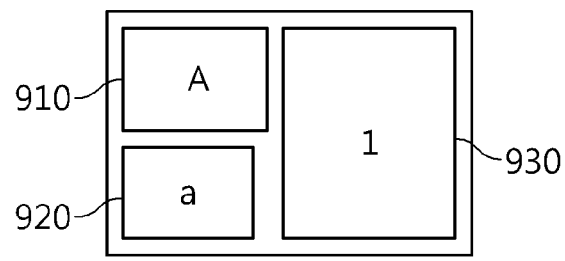
FIGS. 9 to 12 are diagrams illustrating examples of changes in a cloud streaming service screen according to embodiments of the present invention.
Figure 10:
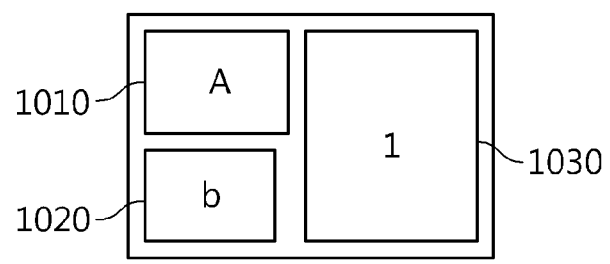

When the screen is changed from FIG. 9 to FIG. 10, the lower left part is changed from "a" 920 to "b" 1020. In this case, a free band is generated because the lower left part has a small size and thus a change in the screen is small. Accordingly, part of "2", i.e., pre-captured data, is sent by only a portion that can be sent in the free band. This is called "2-1."

When the screen is changed from FIG. 10 to FIG. 11, the upper left part is changed from "A" 1010 to "B" 1110. In this case, a free band is generated because the upper left part has a small size and thus a change in the screen is small. Accordingly, a part of "2", i.e., pre-captured data, is sent by only a portion that can be sent in the free band. This is called "2-2."

A section in which the screen is changed from FIG. 11 to FIG. 12 is a pre-capture section. Since "2", i.e., the pre-captured data, has not been fully sent, the remaining part that has not been sent is sent. This is called "2-3."

If "2" is divided and "2" is fully sent without sending "2-1" and "2-2", i.e., some of the divided parts, a delay time may occur because the amount of data is large. In accordance with the present invention, however, if "2-1" and "2-2", i.e., parts of the pre-captured data, are previously sent and only the remaining part "2-3" is sent when the pre-capture section is entered, "2" can be fully sent until a subsequent input is received, thereby being able to minimize a delay time.

Figure 13:
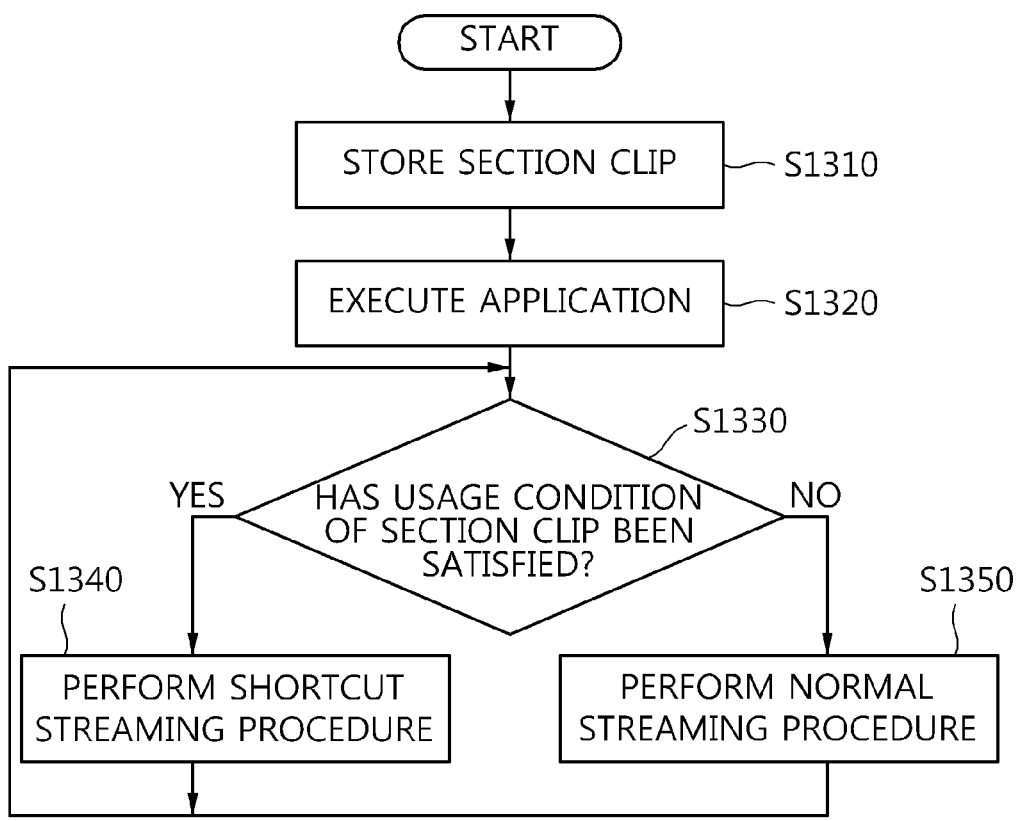
FIG. 13 is an operational flowchart illustrating a method of providing a cloud streaming service according to an embodiment of the present invention.

FIG. 13 is an operational flowchart illustrating a method of providing a cloud streaming service according to an embodiment of the present invention.

Referring to FIG. 13, in the method of providing a cloud streaming service according to an embodiment of the present invention, a section clip in which an execution screen corresponding to a predetermined execution section of an application has been rendered is stored at step S1310.

In this case, the section clip may be generated by performing the shortcut streaming procedure of performing rendering, capture and encoding within the execution section, and the shortcut streaming procedure may use fewer resources than the normal streaming procedure.

In this case, the section clip may be generated with respect to a section in which the resources are used at a predetermined level or higher through the previous execution of the application.

In this case, the section clip may be generated in accordance with the Quality Assurance (QA) of the application.

In this case, the execution section may be identically set with respect to the same application, and may be differently set with respect to different applications.

Furthermore, in the method of providing a cloud streaming service according to this embodiment of the present invention, the application is executed for a cloud streaming service at step S1320.

Furthermore, in the method of providing a cloud streaming service according to this embodiment of the present invention, whether the usage condition of the section clip has been satisfied may be determined by considering the execution state of the application executed for the cloud streaming service at step S1330.

In this case, the execution state may be execution timing of the application, and the usage condition may relate to whether the execution timing of the application falls within a predetermined section.

Furthermore, in the method of providing a cloud streaming service according to an embodiment of the present invention, if it is determined that the usage condition of the section clip has not been satisfied, the normal streaming procedure of performing rendering, capture, encoding, and sending may be performed in each screen update cycle at step S1350.

Furthermore, in the method of providing a cloud streaming service according to this embodiment of the present invention, if it is determined that the usage condition of the section clip has been satisfied, the shortcut streaming procedure for sending the section clip may be performed at step S1340.

Figure 14:
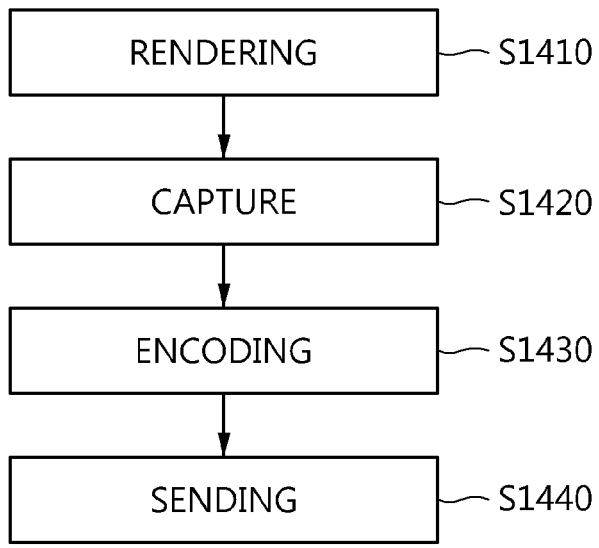
FIG. 14 is an operational flowchart illustrating an example of the normal streaming procedure of FIG. 13.

FIG. 14 is an operational flowchart illustrating an example of the normal streaming procedure of FIG. 13.

Referring to FIG. 14, in the normal streaming procedure of FIG. 13, first, an execution result screen of the application may be rendered at step S1410. In this case, the rendering may be performed by software, or may be performed by hardware, such as a graphic processing unit (GPU).

Furthermore, in the normal streaming procedure, a rendered screen may be captured at step S1420.

Furthermore, in the normal streaming procedure, the captured screen may be encoded at step S1430. In this case, encoding may be performed using various encoding schemes depending on the type of cloud streaming server and/or the type of executed application.

Furthermore, in the normal streaming procedure, the encoded screen is sent to the terminal at step S1440.

Figure 15:
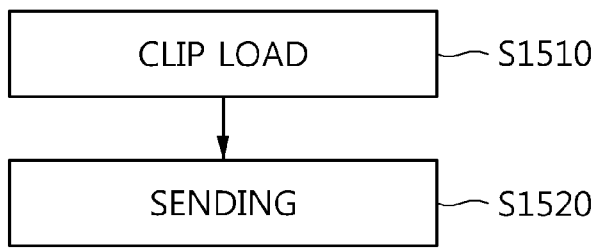
FIG. 15 is an operational flowchart illustrating an example of the shortcut streaming procedure of FIG. 13.

FIG. 15 is an operational flowchart illustrating an example of the shortcut streaming procedure of FIG. 13.

Referring to FIG. 15, in the shortcut streaming procedure of FIG. 13, a section clip corresponding to stored execution timing of the application may be loaded at step S1510. In this case, the section clip may have been generated through rendering, capture, and encoding by executing the application in advance.

Furthermore, in the shortcut streaming procedure, the loaded section clip may be sent at step S1520.

The shortcut streaming procedure of FIG. 8 takes up fewer server resources than the normal streaming procedure of FIG. 7 because it does not require rendering, capture, and encoding processes compared to the normal streaming procedure.

The steps of FIGS. 13, 14, and 15 may be performed sequentially, may be performed in reverse order, or may be performed simultaneously.

Figure 16:
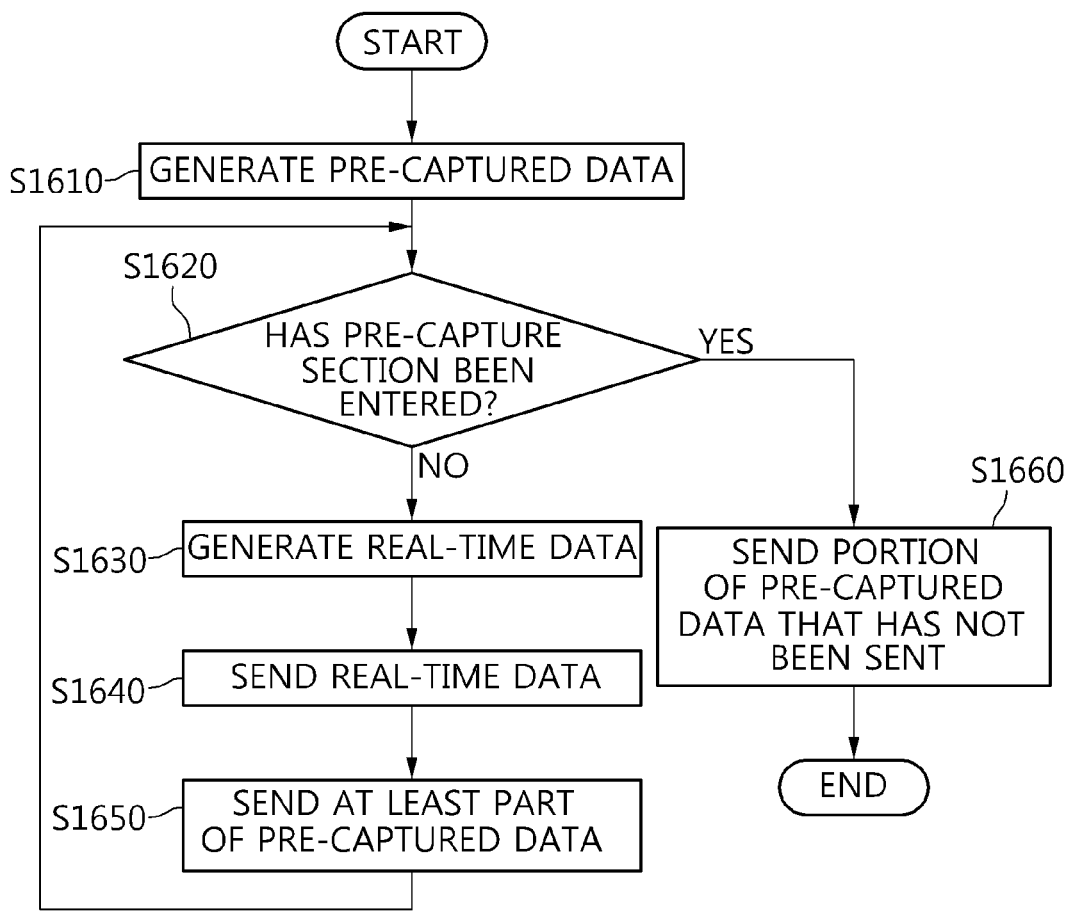
FIG. 16 is an operational flowchart illustrating an example of a streaming service method (from the viewpoint of a server) according to another embodiment of the present invention.

FIG. 16 is an operational flowchart illustrating an example of a streaming service method (from the viewpoint of a server) according to another embodiment of the present invention.

Referring to FIG. 16, in the cloud streaming service method according to this embodiment of the present invention, pre-captured data may be generated by capturing and encoding an execution screen corresponding to a predetermined pre-capture section of the application and stored at step S1610.

In some embodiments, the pre-capture section may be a section which has been retrieved based on a user input scenario and in which a change in a screen is larger than a predetermined level.

That is, a scenario that is predicted for the application and that is based on a user input is generated. When a screen is changed according to the scenario, a section in which a change in the screen is larger than a predetermined level may be set as the pre-capture section. For example, if 50% or larger of a screen is changed based on a user input scenario, a corresponding section may be set as the pre-capture section.

Alternatively, the pre-capture section may be a section which has been analyzed based on the execution history of the application and in which a change in a screen is larger than a predetermined level.

That is, the execution history indicative of the history of the application executed in the past may be stored, and a section in which a change in a screen is larger than a predetermined level in the execution history may be set as the pre-capture section. For example, a section in which 50% or larger of a screen is changed in the execution history may be set as the pre-capture section.

Alternatively, the pre-capture section may be a section which has been analyzed based on the execution history of the application and in which the number of entries of users is larger than a predetermined level.

That is, a section in which users make many entries, i.e., many requests are generated, may be set as the pre-capture section by analyzing an execution history.

Alternatively, the pre-capture section may be set by combining one or more of the aforementioned three types of criteria.

Furthermore, in the cloud streaming service method according to this embodiment of the present invention, a user input is received, and whether the pre-capture section has been entered is determined at step S1620. If it is determined that the pre-capture section has not been entered, real-time data is generated by capturing and encoding an execution screen corresponding to the current section of the application executed for a cloud streaming service at step S1630.

In this case, the real-time data may be data generated by capturing and encoding a current screen in which the application executed in response to a user input is being executed. That is, real-time data continues to be generated in real time as the application is executed.

Furthermore, in the cloud streaming service method according to this embodiment of the present invention, the real-time data may be sent at step S1640.

In this case, if the size of the real-time data is small, a free band may be generated until a subsequent input is received.

Furthermore, in the cloud streaming service method according to this embodiment of the present invention, at least part of the pre-captured data may be sent at step S1650.

In some embodiments, at the step of sending the at least part of the pre-captured data, at least part of the portion of the pre-captured data that has not been sent may be sent during a free band until a subsequent input is received after the step of sending the real-time data corresponding to the current section.

That is, the real-time data generated by capturing and encoding a screen requested by the terminal device along with a user input may be first sent, and the pre-captured data may be sent if a free band is present until a subsequent input is received. If a free band is not present, only the real-time data may be sent. In this case, although the overall pre-captured data is not sent, part of the pre-captured data corresponding to the free band may be sent. The remaining part that has not been sent may be sent if a free band is present after a subsequent input has been received and real-time data has been sent.

Furthermore, in the cloud streaming service method according to this embodiment of the present invention, a user input may be received again, and whether the pre-capture section has been entered may be determined at step S1620.

If the application has entered the pre-capture section and the overall pre-captured data has not been sent, the part of the pre-captured data that has not been sent is sent at step S1660.

That is, if the overall pre-captured data has been sent when the pre-capture section has entered, the terminal device may provide a cloud streaming service using the pre-captured data received instead of real-time data, and a free band may be present because the cloud streaming server has no data to be sent. In contrast, if the overall pre-captured data has not been sent when the pre-capture section has been entered, the cloud streaming server may send the remaining part of the pre-captured data that has not yet been sent so that the terminal device can provide the cloud streaming service.

Although not illustrated in FIG. 16, in the cloud streaming service method according to this embodiment of the present invention, if real-time data to be sent is different from the pre-captured data when the pre-capture section is entered, only the portion of the real-time data that is different from the pre-captured data may be sent.

In this case, pre-captured data corresponding to the pre-capture section that has been predicted based on a user input scenario or analyzed based on the execution history of the application may not be fully identical with real-time data that has been actually requested. In this case, it may be efficient to provide a cloud streaming service by sending only a different part, rather than by sending the overall real-time data, and combining the different part with the pre-captured data that has been previously sent. Accordingly, when the pre-capture section has been entered, the different part between the real-time data and the pre-captured data may be recognized, and only the different part may be sent.

Figure 17:
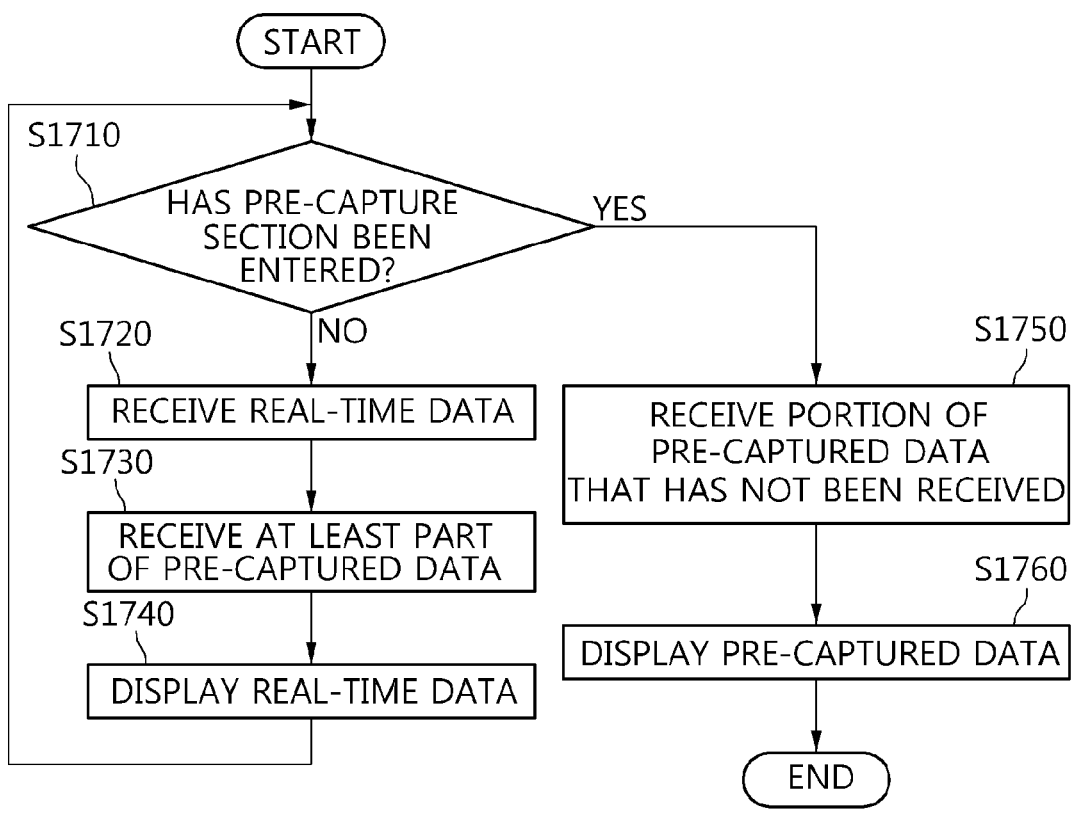
FIG. 17 is an operational flowchart illustrating an example of a cloud streaming service method (from the viewpoint of a terminal) according to another embodiment of the present invention.

FIG. 17 is an operational flowchart illustrating an example of a cloud streaming service method (from a viewpoint of a terminal) according to another embodiment of the present invention.

Referring to FIG. 17, in the cloud streaming service method according to an embodiment of the present invention, a user input may be sent, and whether a pre-capture section has been entered is determined at step S1710. If the pre-capture section has not been entered, real-time data generated by capturing and encoding an execution screen corresponding to the current section of the application executed on a cloud streaming server may be received at step S1720.

In this case, the real-time data may be data generated by capturing and encoding a current screen in which the application executed in response to the user input is being executed. That is, real-time data continues to be received as the application is executed.

Furthermore, in the cloud streaming service method according to this embodiment of the present invention, at least part of pre-captured data generated by capturing and encoding the execution screen corresponding to a predetermined pre-capture section of the application may be received at step S1730.

In this case, the pre-capture section may be a section that has been retrieved based on a user input scenario and in which a change in a screen is larger than a predetermined level.

That is, a scenario that is predicted for the application and that is based on the user input is generated. When a screen is changed according to the scenario, a section in which a change in the screen is larger than a predetermined level may be set as the pre-capture section. For example, if 50% or larger of a screen is changed based on a user input scenario, a corresponding section may be set as the pre-capture section.

Alternatively, the pre-capture section may be a section which has been analyzed based on the execution history of the application and in which a change in a screen is larger than a predetermined level.

That is, the execution history indicative of the history of the application executed in the past may be stored, and a section in which a change in a screen is larger than the predetermined level in the execution history may be set as the pre-capture section. For example, a section in which 50% or larger of a screen is changed in the execution history may be set as the pre-capture section.

Alternatively, the pre-capture section may be a section which has been analyzed based on the execution history of the application and in which the number of entries of users is larger than a predetermined level.

That is, a section in which users make many entries, i.e., many requests are generated, may be set as the pre-capture section by analyzing an execution history.

Alternatively, the pre-capture section may be set by combining one or more of the aforementioned three types of criteria.

In some embodiments, at the step of receiving the at least part of the pre-captured data, at least part of the portion of the pre-captured data that has not been received may be received during a free band until a subsequent input is sent after the step of receiving real-time data corresponding to the current section.

That is, real-time data generated by capturing and encoding a screen requested along with the user input may be first received, and the pre-captured data may be received if a free band is present until a subsequent input is sent. If a free band is not present, only the real-time data may be received. In this case, although the overall pre-captured data is not received, part of the pre-captured data corresponding to the free band may be received. Part of the pre-captured data that has not been received may be received if a free band is present after a subsequent input has been sent and the real-time data has been received.

Furthermore, in the cloud streaming service method according to this embodiment of the present invention, a cloud streaming service may be provided by displaying the real-time data on a screen at step S1740.

Furthermore, in the cloud streaming service method according to this embodiment of the present invention, a user input may be sent again and whether the pre-capture section has been entered is determined in response to the user input at step S1710.

Furthermore, in the cloud streaming service method according to this embodiment of the present invention, if the pre-capture section has been entered and the overall pre-captured data has not been received, the part of the pre-captured data that has not been received is received at step S1750.

That is, if the overall pre-captured data has been received when the pre-capture section has been entered, the terminal device may provide a cloud streaming service using the pre-captured data received instead of real-time data, and a free band may be present because the cloud streaming server has not data to be sent. In contrast, if the pre-capture section has been entered but the overall pre-captured data has not been received, the remaining part of the pre-captured data that has not been received may be received and the cloud streaming service may be provided.

Furthermore, in the cloud streaming service method according to this embodiment of the present invention, a cloud streaming service may be provided by displaying the pre-captured data on a screen at step S1760.

That is, if the pre-capture section has been entered and the cloud streaming service can be provided using the pre-captured data, the cloud streaming service is provided by displaying the pre-captured data on a screen.

Although not illustrated in FIG. 17, in the cloud streaming service method according to an embodiment of the present invention, if the pre-capture section has been entered but real-time data is different from the pre-captured data, only the portion of the real-time data that is different from the pre-captured data may be received.

In this case, the pre-captured data corresponding to the pre-capture section that has been predicted based on a user input scenario or analyzed based on the execution history of the application may not be fully identical with real-time data that has been actually requested. In this case, it may be efficient to provide the cloud streaming service by receiving only a different part, rather than by receiving the overall real-time data, and combining the different part with the previously received pre-captured data. Accordingly, when the pre-capture section has been entered, the cloud streaming server may recognize a different part between real-time data and the pre-captured data and send only the different part.

The terminal device may provide the cloud streaming service by combining the different part with the pre-captured data.

The steps of FIGS. 16 and 17 may be performed sequentially, may be performed in reverse order, or may be performed simultaneously.

The method of providing a cloud streaming service according to the present invention may be implemented as a program or a smart phone app that can be executed by various computer means. In this case, the program or smart phone app may be recorded on a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and the vice versa.

As described above, the cloud streaming service system and the method and apparatus for providing a cloud streaming service according to the present invention are not limitedly applied to the configurations and operations of the above-described embodiments, but all or some of the embodiments may be selectively combined and configured so that the embodiments may be modified in various ways.

INDUSTRIAL APPLICABILITY

In accordance with the present invention, a problem in which the maximum number of applications executable in a server is limited due to some sections having high resource usage upon the provision of a cloud streaming service can be solved. A delay time in a section having a large change of a screen can be minimized by recognizing the section having a large change in the screen, previously capturing and encoding the screen, and sending the encoded screen in a free band. A user's sensory response speed can be improved by sending only a different part if previously sent pre-captured data is different from data to be actually sent. Furthermore, profits from a cloud streaming service can be maximized because the number of applications executable by a cloud streaming server is increased and thus a cloud streaming service can be provided to more users. Furthermore, the cloud streaming service industry can be activated because the time and resources taken up upon the provision of a cloud streaming service can be reduced, thereby contributing to the development of the industry.

The invention claimed is:
1. A cloud streaming server, comprising:
   a storage device that stores a section clip which is generated by executing an application in advance, and by rendering, capturing, and encoding an execution screen corresponding to a predetermined portion of the whole execution section of the application; and a processor that executes the application upon receiving a request for a cloud streaming service from a terminal, determines whether a usage condition of the section clip has been satisfied by determining whether the execution timing of the application belongs to an execution section of the stored section clip, and provides the cloud streaming service for the application to the terminal by performing a normal streaming procedure of performing rendering, capture, encoding, and sending in each screen update cycle if the usage condition of the section clip has not been satisfied or performing a shortcut streaming procedure for sending the stored section clip if the usage condition has been satisfied, wherein the section clip is generated for a section in which resources of the cloud streaming server are used at a predetermined level or higher by executing the application in advance during a quality assurance step;

wherein the predetermined level is based on the resources used to execute the application for at least one of:

the section in which a change in a screen has been retrieved based on a user input scenario, the section in which a change in a screen has been analyzed based on an execution history of the application and the section in which the number of entries of users, has been analyzed based on the execution history of the application; and wherein the shortcut streaming procedure sends the stored section clip during a free band.

2. The cloud streaming server of claim 1, wherein the shortcut streaming procedure uses fewer resources than the normal streaming procedure.

3. A method of providing a cloud streaming service, the method performed by a cloud streaming server, the method comprising:

storing a section clip which is generated by executing an application in advance, and rendering, capturing, and encoding an execution screen corresponding to a predetermined portion of the whole execution section of the application;

executing the application upon receiving a request for the cloud streaming service from a terminal:

determining whether a usage condition of the section clip has been satisfied by determining whether the execution timing of the application belongs to an execution section of the created section clip; and performing a normal streaming procedure of performing rendering, capture, encoding, and sending in each screen update cycle if the usage condition has not been satisfied; or performing a shortcut streaming procedure for sending the section clip if the usage condition has been satisfied, wherein the section clip is generated for a section in which resources of the cloud streaming service are used at a predetermined level or higher by executing the application in advance during a quality assurance step;

wherein the predetermined level is based on the resources used to execute the application for at least one of:

the section in which a change in a screen has been retrieved based on a user input scenario, the section in which a change in a screen has been analyzed based on an execution history of the application and the section in which the number of entries of users, has been analyzed based on the execution history of the application; and wherein the shortcut streaming procedure sends the stored section clip during a free band.

4. The method of claim 3, wherein the shortcut streaming procedure uses fewer resources than the normal streaming procedure.

5. A cloud streaming server, comprising:

a processor that generates real-time data by capturing and encoding an execution screen corresponding to a current section of an application executed for a cloud streaming service requested by a terminal;

a storage device stores pre-captured data generated by capturing and encoding an execution screen corresponding to a predetermined pre-capture section of the application; and a transceiver that sends the real-time data and at least part of the pre-captured data to the terminal, wherein the pre-capture section is one of:

a section in which a change in a screen, which has been retrieved based on a user input scenario is larger than a predetermined level, a section in which a change in a screen, which has been analyzed based on an execution history of the application, is larger than a predetermined level, and a section in which the number of entries of users, which has been analyzed based on the execution history of the application, is larger than a predetermined level, wherein the predetermined level satisfies a usage condition for the resources used by the cloud streaming service for the section as determined by executing the application in advance during a quality assurance step; and wherein the transceiver sends at least a part of a portion of the pre-captured data that has not been sent during a free band until a subsequent input is received after sending real-time data corresponding to the current section, sends a portion of the pre-captured data that has not been sent if the pre-capture section has been entered before the pre-captured data is fully sent and a request to send real-time data corresponding to the pre-capture section is received, or sends only a part of the real-time data that is different from the pre-captured data if the pre-captured data is different from data to be actually sent when the application enters the pre-capture section.

\* \* \* \* \*